Feb. 27, 1945.  O. MONACO  2,370,411
GRAPPLE
Filed May 19, 1944

INVENTOR.
Otino Monaco,
BY
Arthur F. Randall
Atty.

Patented Feb. 27, 1945

2,370,411

UNITED STATES PATENT OFFICE 2,370,411

GRAPPLE

Otino Monaco, Medford, Mass.

Application May 19, 1944, Serial No. 536,268

6 Claims. (Cl. 294—104)

This invention is a grapple or clamp of that class which is provided at one end of the cable of a crane or derrick and employed in handling and transporting large heavy pieces of sheet metal or plates.

The invention has for its object to improve the construction and operation of grapples of the class described, particularly with respect to the plate-gripping mechanism thereof.

To this end I have provided a grapple of the class indicated which, in its preferred form, may be constructed and operate as set forth in the following description, the several novel features of the invention being separately pointed out and defined in the claims at the close of the description.

Figures 1, 2, 3, 4:
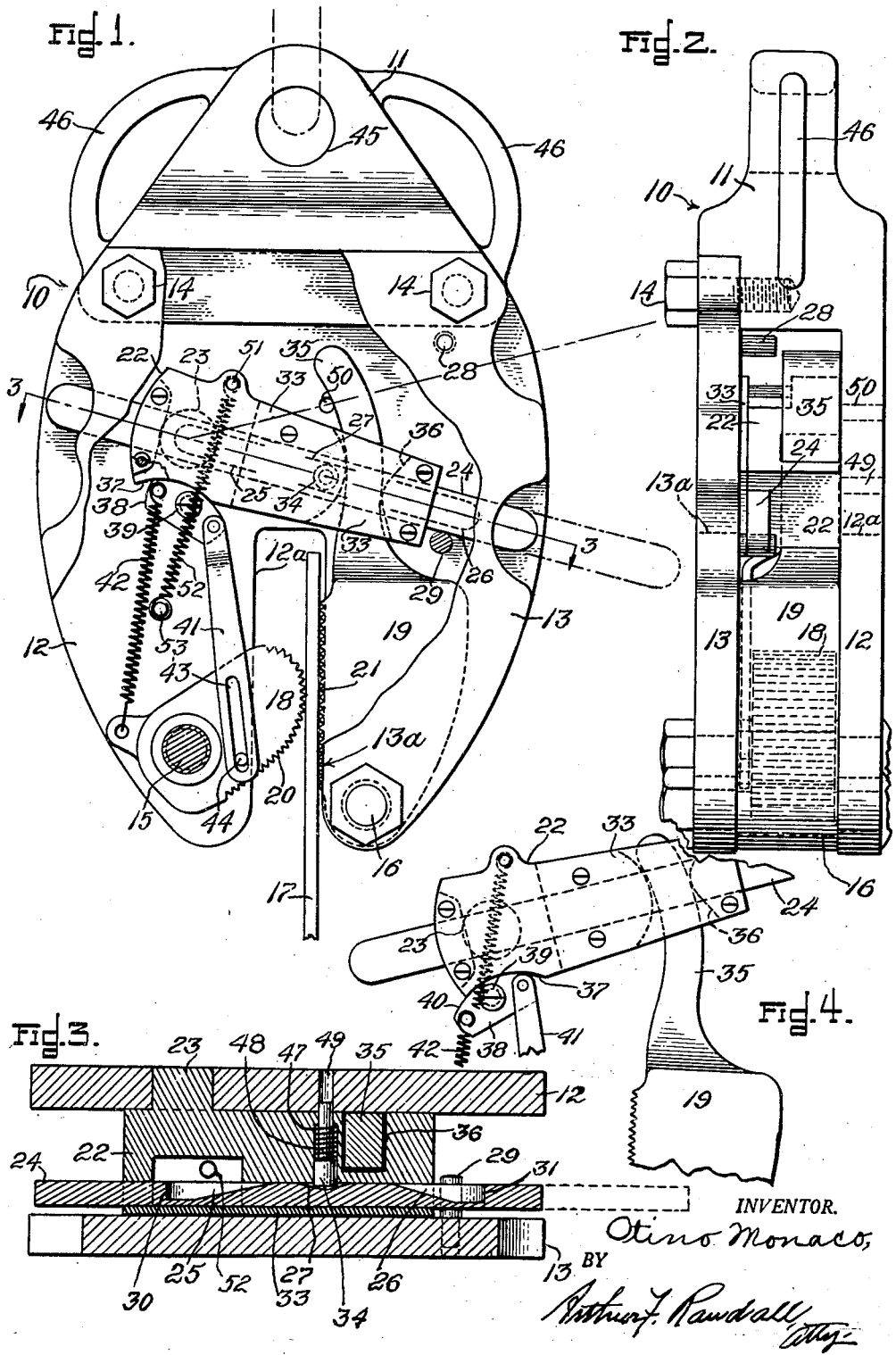
Figure 1 is a front elevation, partly broken away and partly in section, of a grapple constructed in accordance with this invention.
Figure 2 is a side elevation of the grapple shown in Fig. 1.
Figure 3 is a section on line 3—3 of Fig. 1.
Figure 4 is a fragmentary view illustrating the operation of the plate-gripping mechanism.

The illustrated embodiment of the invention comprises a body or frame that is indicated generally at 10 in Figs. 1 and 2 of the drawing, said frame including a head 11 at the upper end thereof, and two walls 12 and 13 extending downwardly from said head in spaced apart relationship so as to provide between them a chamber within which the parts of the gripping mechanism of the device are arranged.

The rear wall 12 may, as shown, be integral with head 11 while the front wall 13 is preferably a separate plate fastened at its upper end to head 11 by screws 14, 14 and fastened at its lower end to rear wall 12 by two stay bolts 15 and 16 which maintain the lower ends of the two walls in spaced apart relationship.

The lower end portions of the two walls 12 and 13 are formed with vertical slots 12a and 13a, respectively, which give to the body frame 10 the form of a yoke that is adapted to straddle the upper marginal portion of a steel plate 17 as shown in Fig. 1 of the drawing. These slots are of one size and shape and are disposed in alinement viewing the device as in Fig. 1 with stay bolt 15 at one side thereof and stay bolt 16 at the opposite side thereof.

Loosely pivoted upon stay bolt 15 between the walls 12 and 13 is a gripping dog 18 that is adapted to engage one side of the plate 17 while the opposite side of the latter is engaged by a gripping jaw 19 whose lower end is loosely pivoted upon the other stay bolt 16.

The dog 18 is formed with a curved toothed peripheral portion 20 which is disposed eccentrically with respect to the axis of stay bolt 15 so that said dog tends to roll on plate 17 when the latter is urged downwardly by its own weight thereby increasing the holding action of the dog.

The jaw 19 is made upon the inner side thereof that is opposite dog 18 with a straight toothed marginal portion 21 which fits flatwise against the plate 17 while the latter is being supported by said jaw and dog 18, said jaw being then locked in plate-engaging position by a lever 22.

Lever 22 is made with a trunnion 23 that is rotatably supported in a bearing provided in rear wall 12 and which serves as the fulcrum of said lever. Slidably mounted in a groove formed longitudinally in one side of lever 22 is a radial extension handle-bar 24 which normally occupies a retracted position where it is wholly inclosed and shielded by the body or frame 10 as shown in Figs. 1 and 3. When this handle-bar 24 is adjusted endwise in either direction one end or the other thereof is accessible for use as a handle by means of which lever 22 can be manually swung up and down on fulcrum 23 to the extent determined by two stops 28 and 29 projecting from the inner side of wall 13.

Handle-bar 24 is made upon one side thereof with two cam recesses 25 and 26 and with a shallow intermediate cam recess 27 disposed midway between the recesses 25 and 26. The two recesses 25 andd 26 are formed to provide inwardly facing abutment shoulders 30 and 31, respectively, one of which engages a plunger 34 to limit endwise movement of bar 24 in one direction and the other of which engages plunger 34 to limit movement of bar 24 in the opposite direction.

The handle-bar 24 is slidably mounted within a groove formed longitudinally in one side of lever 22 and is held in position within this groove by a plate 33 fastened by screws to the lever.

Plunger 34 is slidably mounted within a hole 47 formed transversely through lever 22 and is yieldingly urged toward and against handle-bar 24 by a coiled spring 48.

Normally the handle-bar 24 is yieldingly held in its intermediate position through the engagement of plunger 34 with recess 27 but when the grapple is to be applied to, or removed from, a plate the handle-bar is pulled endwise in either direction to the extent permitted by one or the other of the stop shoulders 30—31 whereupon the end portion then projecting beyond the body of the grapple, as indicated by dotted lines at the right of Fig. 1 for example, will afford a hand-hold by which the lever 22 can be conveniently operated. This outward adjustment of the handle-bar 24 also has the effect of increasing the leverage in favor of the operator.

When the lever 22 is swung downwardly into its lowermost position where handle-bar 24 is against stop 29 the plunger 24 occupies a position where it is axially alined with a socket 49 formed in rear wall 12 (Figs. 2 and 3). It will therefore be clear that if the handle-bar is then returned to its intermediate position shown in Figs. 1 and 3 the plunger 34 will be displaced endwise by the handle-bar and occupy the socket 49 thereby locking lever 22 in its lowermost position while the engagement of plunger 34 with socket 27 (Fig. 3) yieldingly holds the handle-bar in its intermediate position.

When the lever 22 is swung into its uppermost position where handle-bar 24 is against stop 28 the plunger 34 is in axial alinement with a socket 50 (Figs. 1 and 2) into which it is projected to lock the lever in that position by the handle-bar when the latter is returned to its intermediate position, the plunger 34 at the same time engaging the recess 27 to yieldingly hold the handle bar against accidental displacement endwise.

At its upper end the jaw 19 is made with an upwardly extending arcuate cam arm or prong 35 which loosely occupies a slot 36 formed transversely across the rear side of lever 22. Cam arm 35 is formed so that when lever 22 occupies its lowermost position as shown in Fig. 1 the outer wall of slot 36 holds jaw 19 rigidly in plate-engaging position and so that when lever 22 is swung upwardly into its uppermost position the inner wall of slot 36 acts against arm 35 to swing jaw 19 away from plate 17 thereby relieving the latter from the clamping action of dog 18. Of course the lever 22 is thus operated to release plate 17 and dog 18 after lowering plate 17 into position upon the ground or other support that is to receive it, after which the grapple is free to be removed from the plate.

Adjacent to, and below the level of the axis of trunnion 23, the lever 22 is made at one side thereof with an arcuate socket 37 (Fig. 1) to cooperate with a rocker 38 pivotally mounted at 39 upon the inner side of rear wall 12, one side of said rocker being also made arcuate as shown at 40 (Fig. 4) and loosely fitting the socket 37 so that swinging movement of lever 22 on the axis of trunnion 23 serves to oscillate rocker 38, the arcuate surfaces 37 and 40 (Fig. 4) of the lever and rocker, respectively, sliding one upon the other.

One end of a link 41 is pivotally connected to rocker 38 at one side of pivot 39 while a spring link 42 has one end thereof connected with said rocker at the opposite side of said pivot. The lower end portion of link 41 is formed with a longitudinal slot 43 that is occupied by a stud 44 projecting from one side of dog 18. Thus when lever 22 is swung upwardly away from the position shown in Fig. 1 the accompanying displacement of jaw 19 away from plate 17 relaxes the grip of the device upon the latter thereby freeing dog 18 for upward swinging movement imparted thereto by rocker 38 acting through link 41 and stud 44. This will be clear from Fig. 4 which shows the rocker in the position it occupies at the completion of the upward swinging movement of lever 22.

The lower end of spring link 42 is connected with dog 18 at the opposite side of stay bolt 15 from stud 44 and when lever 22 is swung downwardly from the position shown in Fig. 4 the accompanying movement of rocker 38 acts through the spring link to swing dog 18 into position against plate 17, the elasticity of the spring permitting the dog to fit itself to the thickness of the plate.

The head 11 of the body or frame is made with an aperture 45 for use in connecting the device with the cable of a crane or derrick. Also, handles 46 are provided at opposite sides of head 11 for use in manually directing the device as it is lowered on to a plate or removed therefrom.

Adjacent to the fulcrum 23 of lever 22 the latter is provided with a laterally projecting stud 51 with which is connected one end of a coiled spring 52 which extends downwardly therefrom and has its opposite end connected with a stud 53 projecting from rear wall 12. Spring 52 is installed under initial tension and the studs 51 and 53 are so located with respect to fulcrum 23 that when lever 22 occupies its uppermost position as shown in Fig. 4 studs 51 and 53 and the axis of fulcrum 23 are in alinement or disposed upon a dead center where the tension of the spring is not imposed upon the lever, so that it remains in its uppermost position should plunger 34 be slightly out of register with socket 50. When lever 22 is swung downwardly toward its lowermost position stud 51 carries the upper end of spring 52 laterally so that its force is imposed upon the lever in a direction to insure the completion of the downward jaw-adjusting and jaw-locking movement thereof.

One important feature of advantage of the above described construction consists in providing operating mechanism for the plate-gripping means which is accessible for operation by a person standing at either side of the plate that is to be gripped or released, without requiring the operator to reach across the top of said plate which is often very inconvenient and sometimes impossible, particularly when stacking the plate alongside of other plates.

It is also an important feature of advantage that all parts of the operating mechanism and of the gripping mechanism are disposed within and shielded by the body frame 10. This will be appreciated when taking into consideration the fact that it is frequently necessary to slide the grapple into position upon a plate that is lying upon the ground with one tine or branch of the yoke-shaped body beneath the same preparatory to lifting the plate. This can readily be accomplished with my improved grapple with either of the two opposite sides thereof resting upon the ground since there are no projecting parts to interfere with this operation and the gripping mechanism can be operated from either side of the device that is uppermost. This advantage is also in evidence when removing individual plates from a stack of plates disposed either vertically or horizontally.

What I claim is:

1. A grapple including, in combination, a yoke-shaped body frame attachable to a cable and made with slotted front and rear walls that are spaced apart to provide a compartment between them; gripping mechanism within said compartment that is operable to grip and also to release a sheet metal plate or the like that is embraced by said yoke-shaped body frame, and manually actuated mechanism for operating said gripping mechanism comprising a member within said compartment pivotally mounted on said body frame and an extension handle-bar slidably mounted on said member and normally occupying a retracted position within said compartment where its opposite ends are shielded by said walls, said handle-bar being adjustable endwise on said member to project one end thereof beyond said body frame for use as a handle by means of which said member is manually operated to control said gripping mechanism.

2. A grapple including, in combination, a yoke-shaped body frame attachable to a cable and made with slotted front and rear walls that are spaced apart to provide a compartment between them; gripping mechanism within said compartment that is operable to grip and also to release the marginal portion of a sheet metal plate or the like that is embraced by said yoke-shaped body frame, and manually actuated mechanism within said compartment for operating said gripping mechanism comprising a transversely disposed lever arm fulcrumed on said body frame and an extension handle-bar slidably mounted on said lever arm to move endwise longitudinally thereof and normally occupying a retracted position within said compartment where its opposite ends are shielded by said walls, said handle-bar being adjustable endwise on said lever arm to project one end thereof beyond said body frame for use as a handle by means of which said lever arm is manually operated to control said gripping mechanism.

3. A grapple constructed in accordance with claim 2 and wherein said handle-bar is adjustable endwise on said lever arm in either direction to project either end portion thereof beyond said body frame for use as a handle whereby said lever arm may be manually operated from either side of the grapple to control said gripping mechanism.

4. A grapple constructed in accordance with claim 2 and wherein said handle-bar normally occupies an intermediate position on said lever arm and is adjustable endwise on the latter in either direction to project either end portion thereof beyond said body frame for use as a handle by means of which said lever arm and gripping mechanism are operated and controlled; means yieldingly maintaining said handle-bar in its intermediate position, and stops for limiting the endwise movement of the handle-bar in each direction.

5. A grapple constructed in accordance with claim 2 and wherein said handle-bar normally occupies an intermediate position on said lever arm and is adjustable endwise on the latter in either direction to project either end portion thereof beyond said body frame for use as a handle by means of which said lever arm and gripping mechanism are operated and controlled; stops for limiting endwise movement of the handle-bar in either direction, and means operated by endwise movement of said handle-bar for locking said lever arm at the limit of its movement in one direction.

6. A grapple constructed in accordance with claim 2 and wherein said handle-bar normally occupies an intermediate position on said lever arm and is adjustable endwise on the latter in either direction to project an end portion thereof beyond said body frame for use as a handle by means of which said lever arm and gripping mechanism are operated and controlled; stops for limiting endwise movement of the handle-bar in each direction, and means operated by endwise adjustment of said handle-bar from its projected to its intermediate position for locking said lever arm in position at the limit of its movement in each direction.

OTINO MONACO.